UNITED STATES PATENT OFFICE.

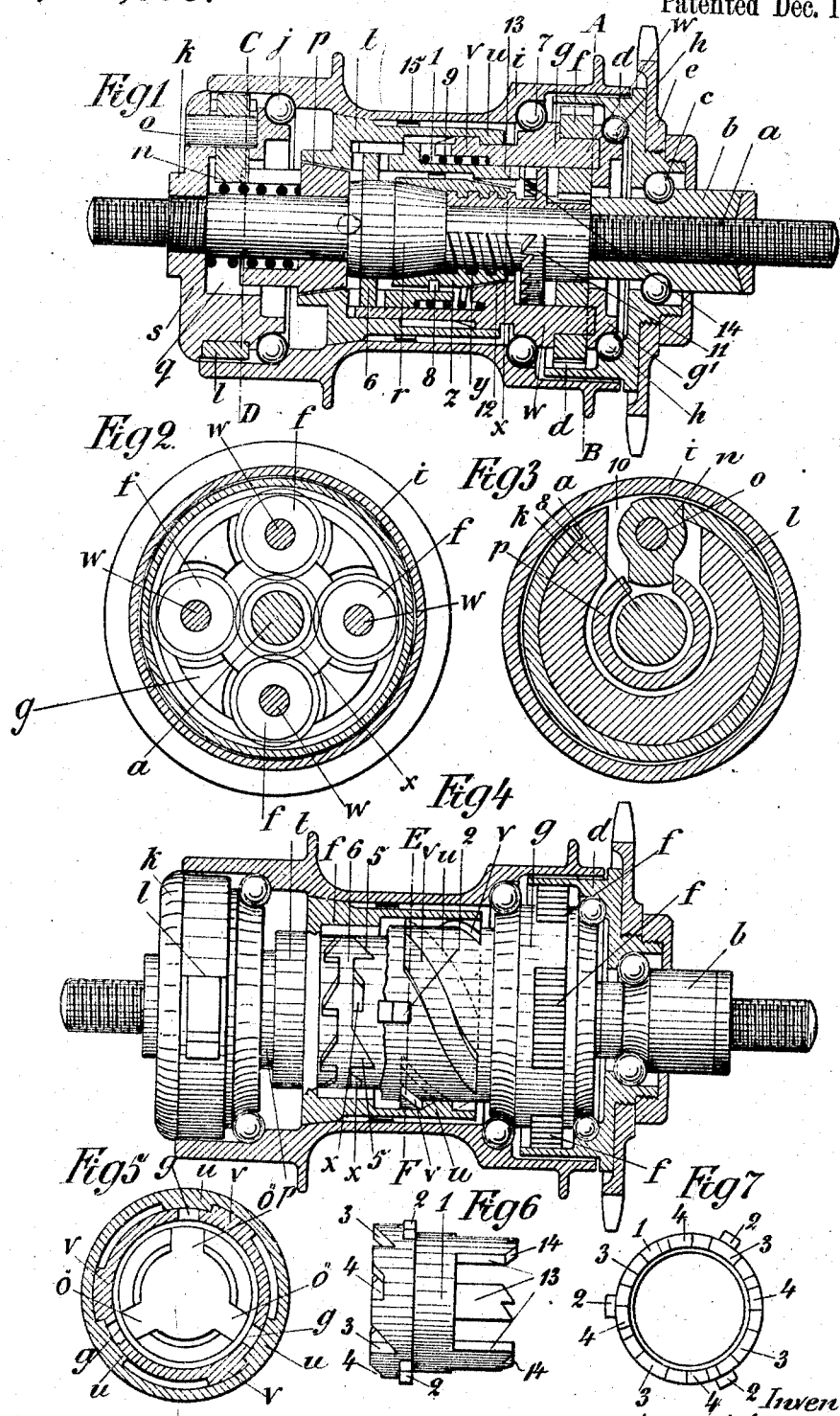

FREDERIK JOHANNES OLSEN, OF ESKEBJERGGAARD PR. SVEBÖLLE, DENMARK.

BICYCLE-HUB.

1,249,659.

Specification of Letters Patent. Patented Dec. 11, 1917.

Application filed May 9, 1917. Serial No. 167,465.

*To all whom it may concern:*

Be it known that I, FREDERIK JOHANNES OLSEN, a subject of the King of Denmark, residing at Eskebjerggaard pr. Svebölle, Denmark, have invented a new and useful Bicycle-Hub; and I do hereby declare the following to be a full, clear, and exact description of the same.

In the known free wheel hubs with two or more gearings, the shifting of which is effected through a so-called planet-wheel system, the gearing by means of the planet-wheels has generally been used for producing the high ratio of gearing, whereas the lower ratio of gearing is obtained when the parts of the hub are coupled together into a unit of mutually immovable parts so that the hub acts like an ordinary fixed hub. This arrangement of the parts, however, has the drawback that the parts of the hub are worn out, by riding with high ratio of gearing, which is the normal, while the low gearing at which the parts of the hub are immovably coupled together is but little used. Therefore it is preferable to arrange the parts in such a manner that the parts are coupled together at the highest ratio of gearing, while the shifting of gear gives the lowest and proportionally little used gearing. This is sometimes effected by inserting between the planetary wheel and the sun wheel another sprocket wheel which reverses the direction of the motion; but this incurs various drawbacks meaning a complication of the hub which, especially owing to the limited space which is at hand for the same, cannot be so strong and durable as a hub without this complication.

The present invention relates to a free wheel hub with a plurality of gearings, at which the highest gearing appears when the parts of the hub are coupled into a unit, and this is obtained by the chain wheel over which the driving chain is laid being arranged on or in connection with the outer tooth-rim of the planetary system and not on the planet wheel carrier. The characteristic in the new hub construction whereby the said advantage can be attained essentially consists in a clutch element being arranged on the sun wheel, which element acts in such a manner that by being turned forwardly or backwardly under influence of the planetary wheels the same is coupled either to this latter or to the stationary shaft of the hub.

In all hitherto known hubs of a similar construction the shifting of the sun wheel from connection with the planetary wheel carrier to connection with the stationary shaft is effected by an axial displacement of the sun wheel, and this displacement is effected independent of the planetary wheels and solely by means of some organ or other which is in connection with the sun wheel. Hereby is found an intermediate position in which the sun wheel is neither in connection with the planetary wheels nor coupled to the shaft, and in this intermediate position no propulsion nor any braking can be effected. This is an essential drawback from which the hub forming the subject matter of the invention does not suffer, the sun wheel being always in connection either with the planetary wheel carrier or with the stationary shaft.

A modification of a hub according to the invention is shown in the drawing in which—

Figure 1 shows a longitudinal section of the hub,

Fig. 2 a section on the line A—B, Fig. 1,

Fig. 3 a section on the line C—D, Fig. 1,

Fig. 4 is a section through the hub-casing showing the inner members in elevation, Fig. 5 a section through the planetary wheel carrier and the clutch on the line E—F, Fig. 4, Fig. 6 is a clutch member in elevation, Fig. 7 the same seen from the left hand side.

Against a shoulder on the stationary shaft $a$ of the hub, Fig. 1, the cone $b$ is secured, on the outside surface of which is arranged a row of balls $c$ carrying the member $d$ on which the chain wheel $e$ is screwed. In the member $d$ is found an inner tooth-rim which meshes with the planetary wheels $f$. The planetary wheels are journaled on the taps $w$, which are integral with the planetary wheel carrier $g$. The taps carry on their ends a ring $g^1$ and between this ring and the member $d$ is arranged a row of balls $h$ as shown.

On the inside surface of the planetary wheel carrier $g$ is arranged a row of balls $i$ carrying the outer hub-casing $i$. The left end of this runs on a row of balls $j$ which is found on the dish $k$ on the stationary shaft $a$. On the surface of the dish $k$ the brake-ring $l$ is arranged in a cut groove. The brake-ring is prevented from revolving one of its end-surfaces bearing against a projection 8 on the dish $k$. The dish is turned out at the inside for a distance so that a space $q$ is formed between the dish and the shaft $a$. From the outer surface of the dish and to the inner surface is cut a channel 10, in which is arranged a two-armed lever $n$ which is turnable on the tap $o$ arranged in the dish $k$. This lever actuates one end of the brake-ring $l$. The other end of the lever engages a notch in the member $p$. This latter bears with its right hand end-surface against the left hand end-surface of a cone $r$ on the stationary shaft $a$. Between the dish $k$ and the member $p$ is found a spring $s$ pressing the member $p$ against the said end-surface of the cone $r$. Between the left hand end-surface of the member $p$ and the dish $k$ is found a space so that the member $p$ can move to the left until bearing against the dish. The outer surface of the member $p$ is conical and can co-act with a correspondingly shaped surface on the clutch-member $t$. Part of the outer surface of this latter is conically shaped and can co-act with a thereto corresponding conical surface in the hub-casing $i$ as shown. Part of the inner surface of the clutch member $t$ is provided with a screw-thread $u$ which co-acts with a corresponding screw-thread $v$ on the outer surface of the planetary wheel carrier $g$.

In the modification shown the screw thread is shown having six-threads; however, each other screw thread is cut away in such a manner that the planetary wheel carrier $g$ is turnable to some extent (about ¼ of a revolution) in relation to the clutch member $t$ before this latter is axially displaced by the screw threads. The planetary wheels $f$ meshing with the tooth-rim on the member $d$ further engage the sun wheel $x$ which can freely rotate on the shaft $a$. On the sun wheel $x$ is found a flange 11 the left hand surface of which has a scarfing as shown in Fig. 1. The sun wheel $x$ has further a prolongation or a hub on the surface of which are found screw threads $y$. These screw threads mesh with screw threads in the clutch sleeve $z$; part of the inner surface of this latter pointing to the left is conically shaped so that it can be coupled together with a corresponding surface on the cone $r$ of the shaft $a$. The right hand outer surface of the clutch sleeve $z$ is also conically shaped, so that it can be coupled to a corresponding inner conical surface 12 on the planetary wheel carrier $g$. In front of this conical surface are found three channels ö—vide Fig. 5. In these three channels slide three projections 13, Fig. 6, the ends of which have a scarfing 14, and these three projections are found on a special shifting member 1. The shifting member 1 has on its outer surface three projections 2, Figs. 6 and 7, engaging the corresponding channels in the planetary wheel carrier $g$ (vide Fig. 5).

In the left hand end surface of the shifting member 1 are found four notches 3, Figs. 6 and 7, and further four other smaller notches 4, which more or less deep notches are arranged alternately.

Into these notches engage four teeth 5 on the right hand end surface of the ring 6. The ring 6 has on its left hand end surface eight teeth which mesh with eight corresponding notches in the clutch member $t$ as shown. In order to prevent the clutch member $t$ from following the motion of the planetary wheel carrier at the start and until the same is coupled to the member $p$, a friction spring 15 is found on the clutch member resting against the inner surface of the hub casing $i$.

The clutch member $z$ has a similar spring 8 resting against the inner surface of the shifting member 1 so as not to follow the movements of the sun wheel $x$ when the latter is turned forwardly or backwardly, but just being displaceable in axial direction. For carrying the shifting member 1 to the left serves a helical spring 9.

The hub works in the following manner:

In the shown position of the parts the sprocket wheels are in activity and the bicycle is pedaled with the lowest gearing. When the chain wheel $e$ with the member $d$ is turned forwardly the inner tooth-rim in the member $d$ will turn the planetary wheels $f$, which will thereby tend to turn the sun wheel $x$ in a backward direction; but thereby the clutch member $z$ will be displaced to the left and be coupled to the fixed shaft $a$. Thereby the sun wheel is prevented from turning further and the planetary wheel $f$ now rolls on the sun wheel $x$, and through the planetary wheel carrier $g$ is transmitted the motion to the screw threads $v$ and $u$ and to the clutch member $t$, which is thereby coupled to the outer hub-casing $i$, which is thereafter turned forwardly. During the free running the outer hub-casing $i$ is released from the clutch member $t$. If shifting of gear be wanted, the tooth rim $e$ is turned in a backward direction and thereby the member $d$ will turn the planetary wheels $f$ in the same direction and these again the sun wheel $x$ in the opposite direction. At the same time the sun wheel will displace the clutch member $z$ to the right and couple the same to the conical surface in the planetary wheel carrier $g$ in such a manner that the sprocket wheels become blocked up. At the same time the planetary wheel carrier in being turned in backward direction will through the shifting member 1 displace the clutch member *t* to the left, because the same is retained, so that it is prevented from following the motion of the planetary wheel carrier *g*. The retaining is effected by the friction of the spring 15 against the inner surface of the hub-casing *i*. The displacement is effected by the teeth 5 on the ring 6 sliding up from the notches 3 in the member 1 thereby coupling the clutch member *t* to the member *p* and thereby being prevented from rotating during the end of the shifting.

When the teeth 5 have slid up from the notches 3 they pass over into the lower notches 4.

When pedaling forwardly the member 1 retains the teeth 5 on the ring 6, and the latter will thereby be turned forwardly and the teeth on the left side of this ring will slide up from the notches in the clutch member *t* and pass over into the other notches on the same. When this is done the screw threads *v* on the planetary wheel carrier *g* bearing against the screw threads *u* on the clutch member *t* will draw the same to the right and thereby couple the same to the hub-casing *i*. At the same time the clutch member *t* through the displacement to the right will push the scarfing on the right end surface of the member 1 into the sun wheel *x* thereby preventing the same from turning independent of the planetary wheels *f* so that the gearing is now blocked up.

The motion from the chain wheel *e* is now transmitted directly through the members *d*, *f*, *g* and *t* to the hub-casing *i*, and the hub now acts directly so that the highest ratio of gearing is used. If now shifting to low gear is wanted this is effected as described above.

Having thus fully described my invention, I claim as new and desire to secure by Letters Patent in U. S. A.:

1. A bicycle hub with coaster brake and a plurality of speed ratios comprising a stationary shaft; a planetary gearing consisting of an outer toothed rim, a planetary wheel carrier having wheels meshing with the said toothed rim, and a sun wheel; means for coupling the said sun wheel to the said stationary shaft when the said sun wheel is turned in one direction; and means for coupling said sun wheel to the said planetary wheel carrier when the said sun wheel is turned in the other direction.

2. A bicycle hub with coaster brake and a plurality of speed ratios comprising a stationary shaft; a planetary gearing consisting of an outer toothed rim, a planetary wheel carrier having wheels meshing with the said toothed rim, and a sun wheel; a clutch member on the said sun wheel adapted to couple the same to the said stationary shaft or to the said planet wheel carrier; means whereby the parts may be coupled together to form a fixed clutch; said clutch being inoperative when the parts of the hub are coupled together.

In testimony whereof I have affixed my signature in presence of two witnesses.

FREDERIK JOHANNES OLSEN.

Witnesses:
 VIGGO BLOM,
 CECIL V. SCHOM.

Copies of this patent may be obtained for five cents each, by addressing the "Commissioner of Patents, Washington, D. C."